(12) United States Patent
Kim et al.

(10) Patent No.: US 11,795,883 B2
(45) Date of Patent: Oct. 24, 2023

(54) APPARATUS AND METHOD OF CONTROLLING AN ENGINE

(71) Applicants: HYUNDAI MOTOR COMPANY, Seoul (KR); KIA CORPORATION, Seoul (KR)

(72) Inventors: Hyeon Woo Kim, Seoul (KR); Back Sik Kim, Osan-si (KR); Jinyoung Jung, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/868,872

(22) Filed: Jul. 20, 2022

(65) Prior Publication Data

US 2023/0203999 A1    Jun. 29, 2023

(30) Foreign Application Priority Data

Dec. 29, 2021 (KR) .................. 10-2021-0190835

(51) Int. Cl.
*F02D 41/00* (2006.01)
*F02D 13/02* (2006.01)
*F02D 41/10* (2006.01)

(52) U.S. Cl.
CPC ..... *F02D 41/0007* (2013.01); *F02D 13/0234* (2013.01); *F02D 41/0005* (2013.01); *F02D 41/10* (2013.01); *F02D 41/107* (2013.01); F02D 2041/002 (2013.01); F02D 2200/602 (2013.01)

(58) Field of Classification Search
CPC ............ F02D 13/0234; F02D 41/0005; F02D 41/0007; F02D 41/10; F02D 41/107; F02D 2041/002; F02D 2200/602
See application file for complete search history.

(56) References Cited

U.S. PATENT DOCUMENTS

| | | |
|---|---|---|
| 8,813,704 B2 | 8/2014 | Kim et al. |
| 9,512,748 B2 | 12/2016 | Kim et al. |
| 9,574,467 B2 | 2/2017 | Ha |
| 9,869,215 B2 | 1/2018 | Son et al. |
| 2004/0031457 A1* | 2/2004 | Kawamura ............ F01L 1/022 123/90.16 |

(Continued)

FOREIGN PATENT DOCUMENTS

JP          10009005 A  *  1/1998

*Primary Examiner* — Audrey B. Walter
(74) *Attorney, Agent, or Firm* — LEMPIA SUMMERFIELD KATZ LLC (57) ABSTRACT

An apparatus for controlling an engine includes: an engine with a cylinder; a throttle valve to adjust a flow rate of intake air supplied to the cylinder; a supercharger to supply supercharged air to the cylinder; an intake valve to supply intake air by selectively opening and closing the cylinder; a variable valve timing device to adjust opening and closing timings of the intake valve; a variable valve duration device to adjust an opening duration of the intake valve; and a controller to adjust the amount of air inside of the cylinder by fixing an intake valve opening (IVO) timing and adjusting an intake valve closing (IVC) timing through the variable valve timing device and the variable valve duration device from a time at which a demanded torque is input to a time at which the demanded torque is followed by the throttle valve or the supercharger.

12 Claims, 10 Drawing Sheets

(56) References Cited

U.S. PATENT DOCUMENTS

2009/0007564 A1* 1/2009 Suzuki .................... F02B 37/24
                                                        60/624
2018/0291777 A1* 10/2018 Nakasaka ............... F02D 15/04

* cited by examiner

APPARATUS AND METHOD OF CONTROLLING AN ENGINE

CROSS-REFERENCE TO RELATED APPLICATION

This application claims priority to and the benefit of Korean Patent Application No. 10-2021-0190835, filed in the Korean Intellectual Property Office on Dec. 29, 2021, the entire contents of which are incorporated herein by reference.

BACKGROUND

(a) Field

The present disclosure relates to an apparatus and a method of controlling an engine, and more particularly, to an apparatus and a method of controlling an engine, which are capable of quickly responding to a sudden change in demanded torque by using a variable valve duration device and a variable valve timing device.

(b) Description of the Related Art

An internal combustion engine generates power by using explosion pressure by burning a mixer in which fuel and air are mixed in a set ratio through a set ignition method.

In this case, a cam shaft is driven by a timing belt connected with a crank shaft. The crank shaft switches a linear movement of a piston in a cylinder by explosion pressure to a rotary movement. The cam shaft operates the intake valve and an exhaust vale such that air is sucked into a combustion chamber while the intake valve is open, and burned gas is discharged from the combustion chamber while the exhaust valve is open.

According to the engine control method in the related art, when the vehicle is accelerated to increase a torque of the engine, the amount of opening of a throttle valve is increased to increase a flow rate of the intake air supplied to the cylinder of the engine, or a turbocharger is operated to increase pressure of the intake air supplied to the cylinder of the engine. Conversely, when the vehicle is decelerated in order to decrease a torque of the engine, the amount of opening of the throttle valve is decreased to decrease a flow rate of the intake air supplied to the cylinder of the engine, or the turbocharger is operated to decrease pressure of the intake air supplied to the cylinder of the engine.

As such, a time delay occurs when the torque of the engine is adjusted by the operation of the throttle valve or the turbocharger. For example, a time delay occurs due to an intake air path from the throttle valve to the cylinder of the engine, or an intake air path from the turbocharger to the cylinder of the engine. The time delay also occurs in forming supercharged air by the operation of the turbocharger occur.

In general, the time delay of about 2 seconds occurs for adjusting a flow rate or pressure of intake air supplied to the cylinder by an operation of the throttle valve or the turbocharger.

We have discovered that the engine control method in the related art has a problem in that it is impossible to quickly respond to a sudden change in demanded torque by a driver due to the time delay.

The matters described in the description of the related art are prepared to enhance the understanding of the background of the present disclosure, and may include matters that are not already known to those of having ordinary skill in the art to which the present technology belongs.

The above information disclosed in this Background section is only for enhancement of understanding of the background of the present disclosure, and therefore it may contain information that does not form the prior art that is already known to a person of ordinary skill in the art.

SUMMARY

The present disclosure provides an apparatus and a method of controlling an engine, which are capable of quickly responding to a demanded torque when the demand torque of a driver is sharply changed.

In an embodiment of the present disclosure, an apparatus for controlling an engine includes: an engine including at least one cylinder generating power by combustion of fuel; a throttle valve configured to adjust a flow rate of intake air supplied to the cylinder; a supercharger configured to supply supercharged air to the cylinder; an intake valve configured to supply intake air by selectively opening and closing the cylinder; a variable valve timing device configured to adjust and closing timings of the intake valve; a variable valve duration device configured to adjust an opening duration of the intake valve; and a controller configured to adjust the amount of air inside the cylinder by fixing an intake valve opening (IVO) timing and adjusting an intake valve closing (IVC) timing through the variable valve timing device and the variable valve duration device in a transition section from a time at which a demanded torque of a driver is input to a time at which the demanded torque is followed by the throttle valve or the supercharger.

The demanded torque of the driver may be calculated from the amount of change of an accelerator per unit time.

When it is determined that the amount of change in the demanded torque of the driver is smaller than a set value and a vehicle is in an acceleration state, the controller may control the amount of air inside the cylinder to increase through the variable valve timing device and the variable valve duration device.

When the engine is a Miller cycle engine, the controller may increase a duration of the intake valve through the variable valve duration device, and delay the intake valve opening and closing timing through the variable valve timing device.

When the engine is an Atkinson cycle engine, the controller may decrease an opening duration of the intake valve through the variable valve duration device, and advance the intake valve opening and closing timing through the variable valve timing device.

When the amount of change in the demanded torque of the driver is smaller than a set value and a vehicle is in a deceleration state, the controller may control the amount of air inside the cylinder to decrease through the variable valve timing device and the variable valve duration device.

When the engine is a Miller cycle engine, the controller may decrease an opening duration of the intake valve through the variable valve duration device, and advance the intake valve opening and closing timing through the variable valve timing device.

When the engine is an Atkinson cycle engine, the controller may increase an opening duration of the intake valve through the variable valve duration device, and delay the intake valve opening and closing timing through the variable valve timing device.

When a torque of the engine follows the demanded torque of the driver, the controller may stop the adjustment of the amount of air inside the cylinder through the variable valve duration device and the variable valve timing device, and follow the demanded torque of the driver through the control of the throttle valve or the supercharger.

In another embodiment of the present disclosure, a method of controlling an engine includes: determining, by a controller, whether the amount of change of a demanded torque of a driver is smaller than a set value; determining, by the controller, whether a vehicle is in an acceleration state or a deceleration state; and adjusting, by the controller, the amount of air inside the cylinder by fixing an intake valve opening (IVO) timing and adjusting an intake valve closing (IVC) timing through a variable valve timing device and a variable valve duration device in a transition section from a time at which the demanded torque of the driver is input to a time at which the demanded torque of the driver is followed by the throttle valve or the supercharger.

When it is determined that the amount of change in the demanded torque of the driver is smaller than a set value and the vehicle is in an acceleration state, the amount of air inside the cylinder may be controlled to increase through the variable valve timing device and the variable valve duration device.

When the engine is a Miller cycle engine, a duration of the intake valve through the variable valve duration device may be increased and the intake valve opening and closing timing is delayed through the variable valve timing device.

When the engine is an Atkinson cycle engine, an opening duration of the intake valve may be decreased through the variable valve duration device, and the intake valve opening and closing timing may be advanced through the variable valve timing device.

When the amount of change in the demanded torque of the driver is smaller than a set value and a vehicle is in a deceleration state, the amount of air inside the cylinder may be controlled to decrease through the variable valve timing device and the variable valve duration device.

When the engine is a Miller cycle engine, an opening duration of the intake valve may be decreased through the variable valve duration device, and the intake valve opening and closing timing may be advanced through the variable valve timing device.

When the engine is an Atkinson cycle engine, an opening duration of the intake valve may be increased through the variable valve duration device, and the intake valve opening and closing timing may be delayed through the variable valve timing device.

When a torque of the engine follows the demanded torque of the driver, the adjustment of the amount of air inside the cylinder through the variable valve duration device and the variable valve timing device may be stopped, and the demanded torque of the driver may be followed through the control of the throttle valve or the supercharger.

According to the apparatus and the method of controlling the engine according to the embodiments of the present disclosure, it is possible to quickly respond to a sudden change in demanded torque of a driver by adjusting a flow rate of intake air supplied to the cylinder of the engine by adjusting an intake valve closing timing through the variable valve timing device and the variable valve duration device.

BRIEF DESCRIPTION OF THE DRAWINGS

These drawings are for reference in describing an exemplary embodiment of the present disclosure, and the technical spirit of the present disclosure should not be construed as being limited to the accompanying drawings.

DETAILED DESCRIPTION

The present disclosure is described more fully hereinafter with reference to the accompanying drawings, in which exemplary embodiments of the present disclosure are shown. As those having ordinary skill in the art would realize, the described embodiments may be modified in various different ways, all without departing from the spirit or scope of the present disclosure.

In the present specification, the parts of the methods may be executed by one or more controllers. The term "controller" refers to a hardware device including a memory and a processor adapted to execute one or more steps, which can be interpreted as an algorithmic structure. The memory is configured to store algorithmic steps and the processor is specifically adapted to execute the algorithmic steps for performing one or more methods which are described in more detail below.

Furthermore, control logic according to an exemplary embodiment of the present disclosure may be implemented as a non-transitory computer-readable medium on a computer-readable medium including executable program instructions executed by a processor, a controller, or the like. Examples of computer-readable media include, but are not limited to, a ROM, a RAM, a compact disk (CD)-ROM, a magnetic tape, a floppy disk, a flash drive, a smart card, and optical data storage devices. A computer-readable reproduction medium may be distributed over a network connected to a computer system, and the computer-readable medium may be stored and executed in a distributed manner, for example, by a telematics server or a measurement controller area network (CAN).

Throughout the specification, unless explicitly described to the contrary, the word "comprise", and variations such as "comprises" or "comprising", should be understood to imply the inclusion of stated elements but not the exclusion of any other elements. When a component, device, element, or the like of the present disclosure is described as having a purpose or performing an operation, function, or the like, the component, device, or element should be considered herein as being "configured to" meet that purpose or to perform that operation or function.

The drawings and description are to be regarded as illustrative in nature and not restrictive, and like reference numerals designate like elements throughout the specification.

In addition, the size and thickness of each configuration shown in the drawings are arbitrarily shown for understanding and ease of description, but the present disclosure is not limited thereto, and the thicknesses of layers, films, panels, regions, etc., are exaggerated for clarity.

Hereinafter, a control apparatus of an engine according to an exemplary embodiment of the present disclosure as described above is described in detail with reference to the accompanying drawings.

Figure 1:
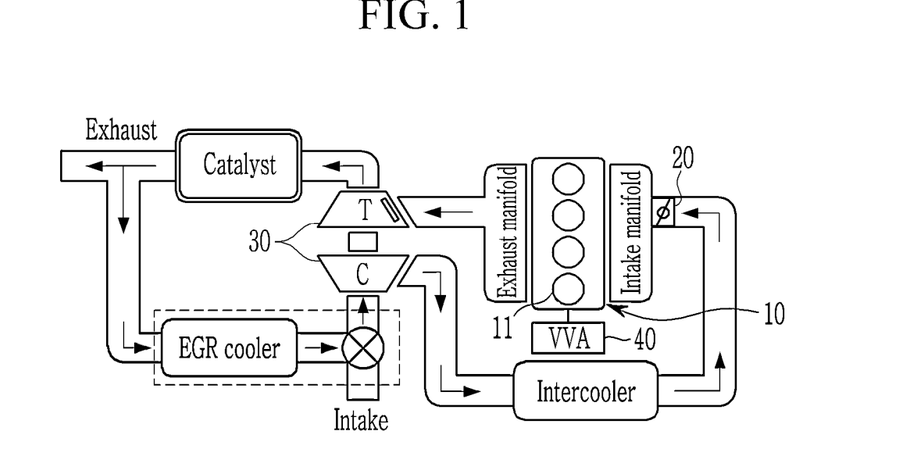
FIG. 1 is a conceptual diagram illustrating a configuration of a control apparatus of an engine according to an embodiment of the present disclosure.
Figure 2:
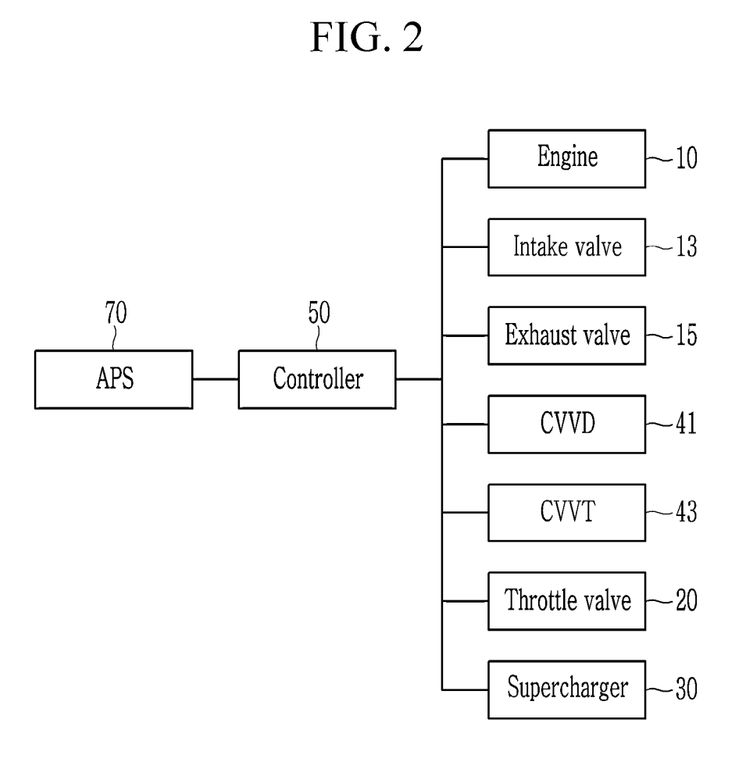
FIG. 2 is a block diagram illustrating a configuration of the control apparatus of the engine according to the embodiment of the present disclosure.

FIG. 1 is a conceptual diagram illustrating a configuration of a control apparatus of an engine according to an embodiment of the present disclosure. FIG. 2 is a block diagram illustrating a configuration of the control apparatus of the engine according to the embodiment of the present disclosure.

As illustrated in FIGS. 1 and 2, the control apparatus of the engine may include an engine 10 including at least one cylinder 11, an intake valve 13 and an exhaust valve 15 for selectively blocking the cylinder 11 of the engine 10, a variable valve device 40 for adjusting an opening/closing timing and opening/closing duration of the intake valve 13, and a controller 50 for controlling the engine 10, the intake valve 13, the exhaust valve 15, and the variable valve device 40.

The cylinder 11 of the engine 10 generates power required for traveling of a vehicle by combustion of fuel. A plurality of cylinders 11 may be provided as needed.

At least one intake valve 13 selectively passes or blocks intake air which flows into the cylinder 11. That is, when the intake valve 13 is opened in an intake stroke, intake air flows into the cylinder 11, and when the intake valve 13 is closed, intake air does not flow into the cylinder 11.

At least one exhaust valve 15 selectively opens or closes in order to selectively discharge exhaust gas generated inside of the cylinder 11 during combustion of fuel. In other words, when the exhaust valve 15 is opened, the exhaust gas is discharged from the cylinder 11 to outside of the cylinder, and when the exhaust valve 15 is closed, the exhaust gas is not discharged from the cylinder 11.

The variable valve apparatus (VVA) 40 may include a continuous variable valve timing (CVVT) device and a continuous variable valve duration (CVVD) device.

The CVVT device 43 adjusts the opening and closing timings of the intake valve 13 and the exhaust valve 15, and the CVVD device 41 adjusts the opening duration of the intake valve 13 and the exhaust valve 15. Specific configurations of the CVVT device 43 and the CVVD device 41 are known to those having ordinary skill in the art, and detailed descriptions thereof are be omitted.

On the other hand, the throttle valve 20 is installed in the intake line through which intake air supplied to the engine 10 flows, and the flow rate of intake air supplied to the cylinder 11 of the engine 10 is adjusted by the opening degree of the throttle valve 20.

In another embodiment, the control apparatus of the engine may include a supercharger 30 for supplying supercharged air to the cylinder 11 of the engine 10.

The supercharger 30 may include a turbocharger that supplies supercharged air to the cylinder 11 using exhaust energy, or an electric supercharger that supplies supercharged air to the cylinder 11 using electrical energy.

The turbocharger may include: a turbine installed in an exhaust line through which exhaust gas from the cylinder 11 is discharged, and a compressor installed in the intake line upstream of the throttle valve 20. The electric supercharger may include a motor and an electric compressor rotated by the motor.

In this embodiment of the present disclosure, the supercharger 30 is a turbocharger, but the scope of the present disclosure is not limited thereto.

The controller 50 controls an output torque of the engine 10 based on the demanded torque of the driver, and to this end, the controller 50 controls the operations of the engine 10, the intake valve 13, the exhaust valve 15, the throttle valve 20, the CVVT device 43, the CVVD 41 device, and the supercharger 30.

Further, in a transient section which corresponds to a time period from when the driver's demand torque is input to when the driver's demand torque is followed by the throttle valve 20 and/or the supercharger 30, the controller 50 fixes an intake valve opening (IVO) timing and adjusts an intake valve closing (IVC) timing through the CVVT device 43 and the CVVD 41 device to adjust the amount of air inside the cylinder 11.

The driver's demanded torque may be determined based on an input from an accelerator position sensor (APS). The APS detects the degree of pressing the accelerator by the driver and transmits detected values (e.g., position values) to the controller 50. When the accelerator is completely pressed, the position value of the accelerator may be 100%, and when the accelerator is not pressed, the position value of the accelerator may be 0%.

The controller 50 may be provided with one or more processors operated by a set program, and the set program may be programmed to perform each operation of a control method of an engine according to an exemplary embodiment of the present disclosure.

Various exemplary embodiments described herein may be implemented in a recording medium readable by a computer or a device similar to the computer by using, for example, software, hardware, or a combination thereof.

According to the implementation by hardware, the exemplary embodiment described herein may be implemented by using at least one of Application Specific Integrated Circuits (ASICs), Digital Signal processors (DSPs), Digital Signal Processing Devices (DSPDs), Programmable Logic Devices (PLDs), Field Programmable Gate Arrays (FPGAs), processors, controllers, micro-controllers, microprocessors, and other electric units for performing functions.

According to the implementation by software, exemplary embodiments, such as procedures and functions, described in this specification may be implemented as separate software modules. Each of the software modules may perform one or more functions and operations described herein. The software code may be implemented as a software application written in a suitable programming language.

Hereinafter, a control method of an engine according to an embodiment of the present disclosure is described in detail with reference to the accompanying drawings.

Figure 3:
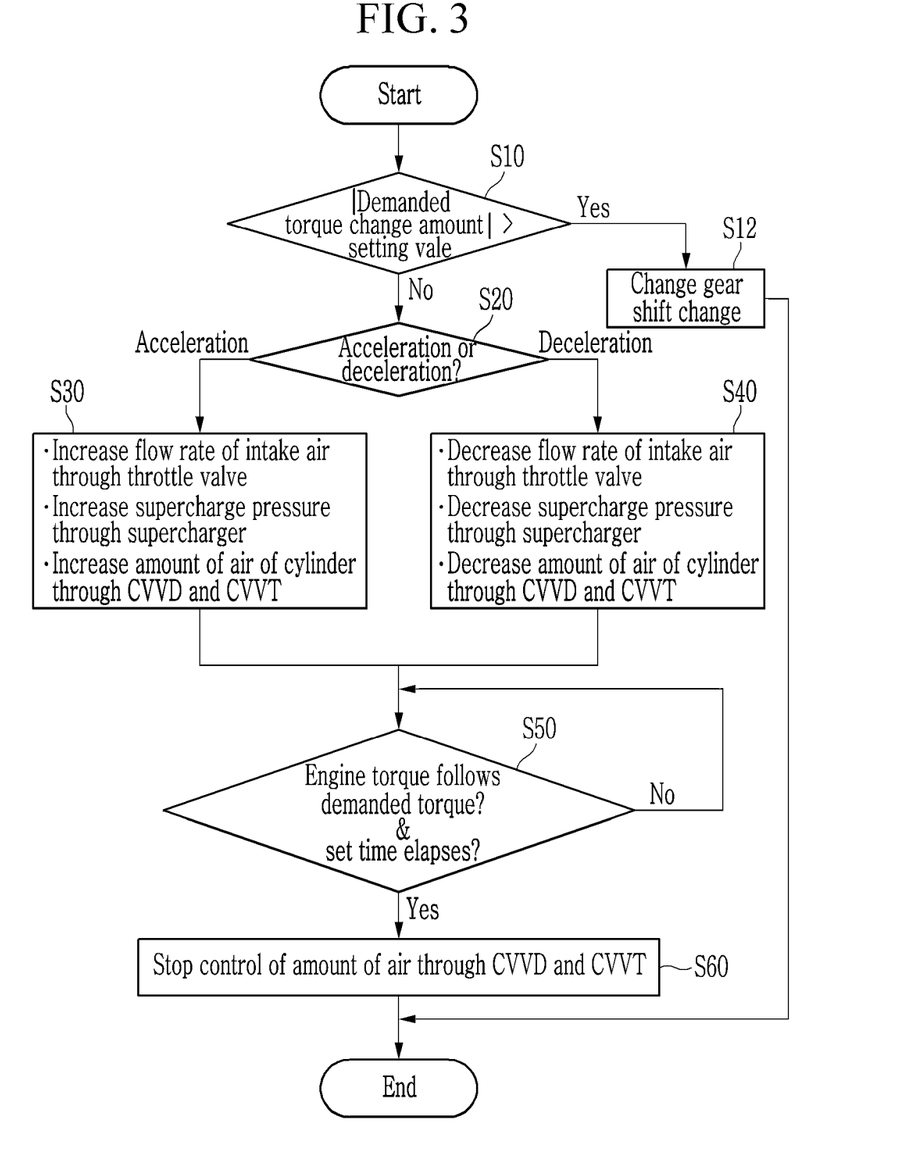
FIG. 3 is a flowchart illustrating a control method of an engine according to an embodiment of the present disclosure.

FIG. 3 is a flowchart illustrating a control method of an engine according to an embodiment of the present disclosure.

As illustrated in FIG. 3, the controller 50 determines whether the amount of change in demanded torque by a driver is equal to or greater than a set value (Step S10). The controller 50 may determine the demanded torque by the driver based on a change in a position value of the APS 70 per unit time.

When an absolute value of the amount of change in demanded torque by the driver is equal to or greater than the set value, the controller 50 tracks the demanded torque by changing a gear shift stage (Step S12).

When the absolute value of the amount of change in demanded torque by the driver is smaller than the set value, the controller 50 determines whether the vehicle is in an acceleration state or a deceleration state (Step S20). The controller 50 may determine the acceleration state or the deceleration state of the vehicle based on the amount of change in the accelerator. For example, when the position value of the accelerator is changed from a small value (for example, 0%) to a large value (for example, 50%), the controller 50 may determine that the vehicle is in the acceleration state. In contrast to this, when the position value of the accelerator is changed from the large value (for example, 50%) to a small value (for example, 0%), the controller 50 may determines that the vehicle is in the deceleration state.

When it determines that the vehicle is in the acceleration state based on the amount of change in the demanded torque of the driver, the controller 50 adjusts the amount of opening of the throttle valve 20 and the amount of supercharged air by the turbo charger in order to follow the demanded torque of the driver. For example, the controller 50 increases the amount of opening of the throttle valve 20 and increases the amount of supercharged air by the turbocharger. Simultaneously, the controller 50 makes a control so as to increase the amount of air inside the cylinder 11 through the CVVT device 43 and the CVVD device 41 and follow the demanded torque of the driver (Step S30).

When it determines that the vehicle is in the deceleration state based on the amount of change in the demanded torque of the driver, the controller 50 adjusts the amount of opening of the throttle valve 20 and the amount of supercharged air by the turbo charger in order to follow the demanded torque of the driver. For example, the controller 50 decreases the amount of opening of the throttle valve 20 and decreases the amount of supercharged air by the turbocharger.

Simultaneously, the controller 50 makes a control so as to decrease the amount of air inside the cylinder 11 through the CVVT device 43 and the CVVD device 41 and follow the demanded torque of the driver (Step S40).

Figure 4:
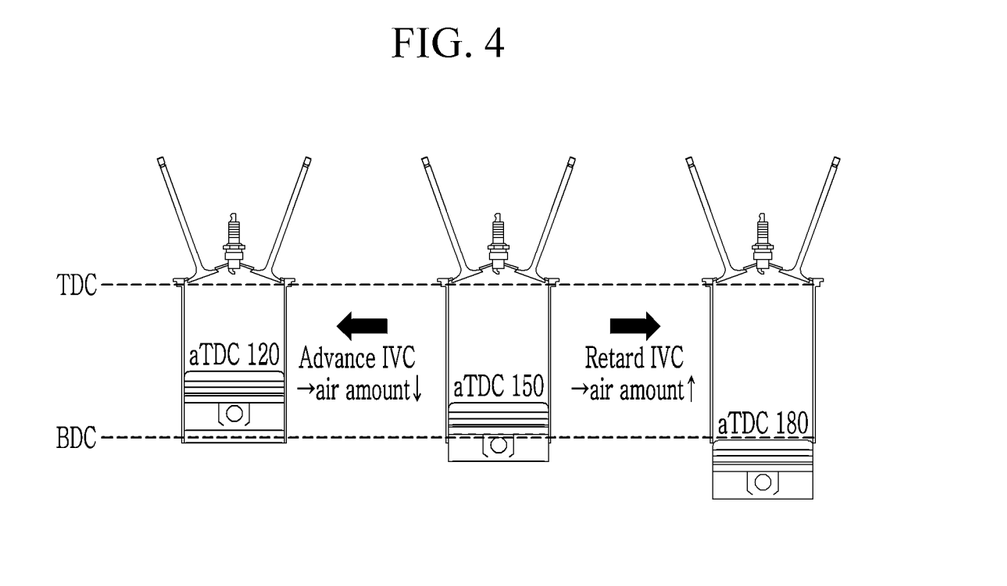
FIG. 4 is a diagram illustrating a change in the amount of air inside of a cylinder according to a change in a closing timing of an intake valve according to one exemplary embodiment of the present disclosure.

FIG. 4 is a diagram illustrating a change in the amount of air inside the cylinder 11 according to a change in a closing timing of the intake valve according to the exemplary embodiment of the present disclosure. FIG. 4 is a diagram illustrating the Miller cycle as an example.

Referring to FIG. 4, theoretically, when the IVC timing is located at a bottom dead center (BDC), a sealed volume of the cylinder 11 becomes maximum. In this case, the amount of air introduced into the cylinder 11 is maximum, and the output of the engine 10 is maximum.

The Miller cycle engine 10 uses a sealed volume smaller than the actual amount of exhaust of the engine 10 by setting the IVC timing before the BDC. However, the Atkinson cycle engine 10 uses a sealed volume smaller than the actual amount of exhaust of the engine 10 by setting the IVC timing after the BDC.

Therefore, it is possible to adjust the amount of air introduced into the cylinder 11 by fixing the IVO timing and adjusting the IVC timing.

In the Miller cycle engine 10, when it is determined that the vehicle is in the acceleration state based on the demanded torque of the driver, the controller 50 increases the opening duration of the intake valve 13 through the CVVD device 41, and when the opening and closing timing of the intake valve 13 is delayed through the CVVT device 43, the IVO timing is maintained in the fixed state, and the IVC timing is delayed.

Figure 5:
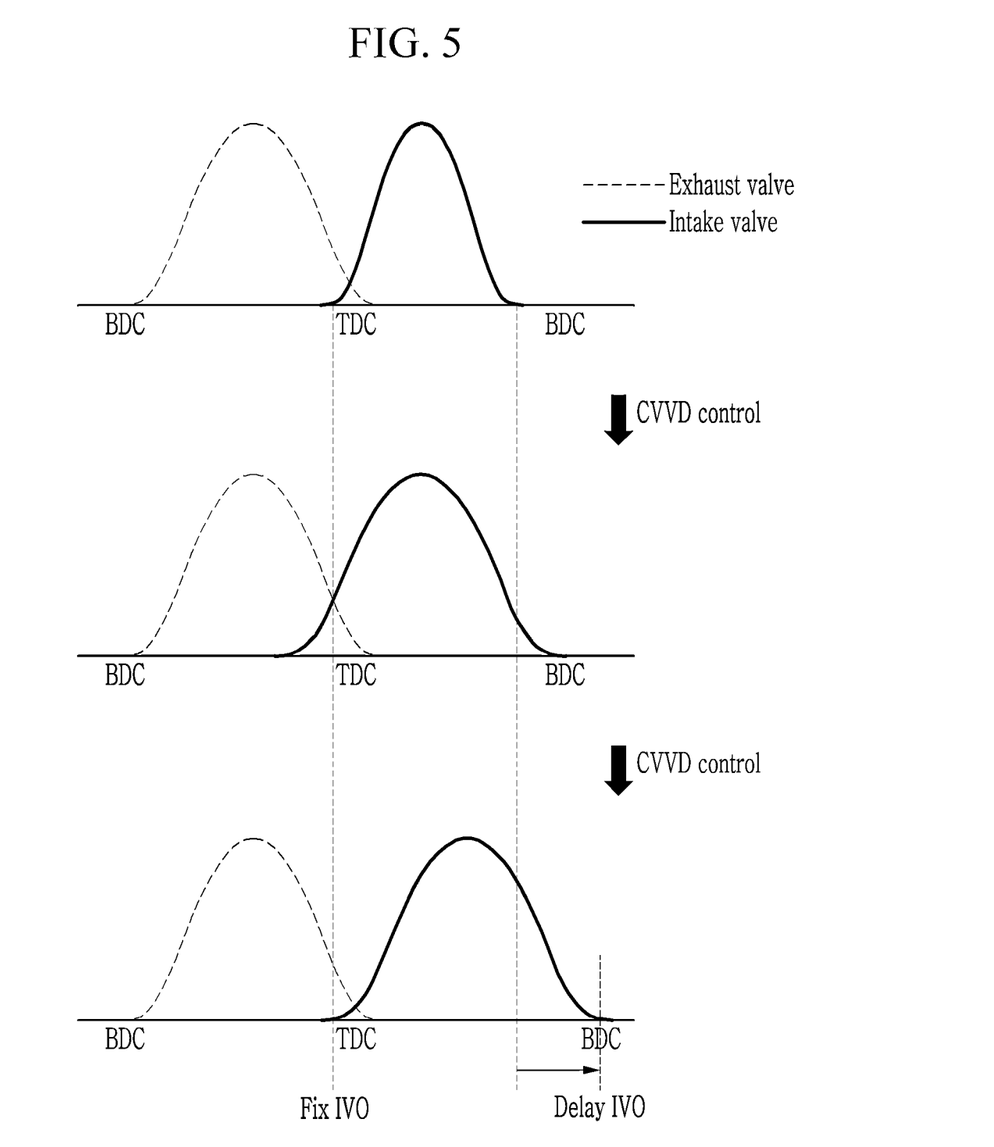
FIG. 5 is a diagram illustrating a profile of the intake valve and an exhaust valve according to one embodiment of the present disclosure.

For example, as illustrated in FIG. 5, when the opening duration of the intake valve 13 is increased through the CVVD device 41, the IVO timing is advanced and the IVC timing is delayed. At this time, when the opening and closing timing of the intake valve 13 is delayed through the CVVT device 43, the IVO is fixed and only the IVC is delayed.

Figure 6:
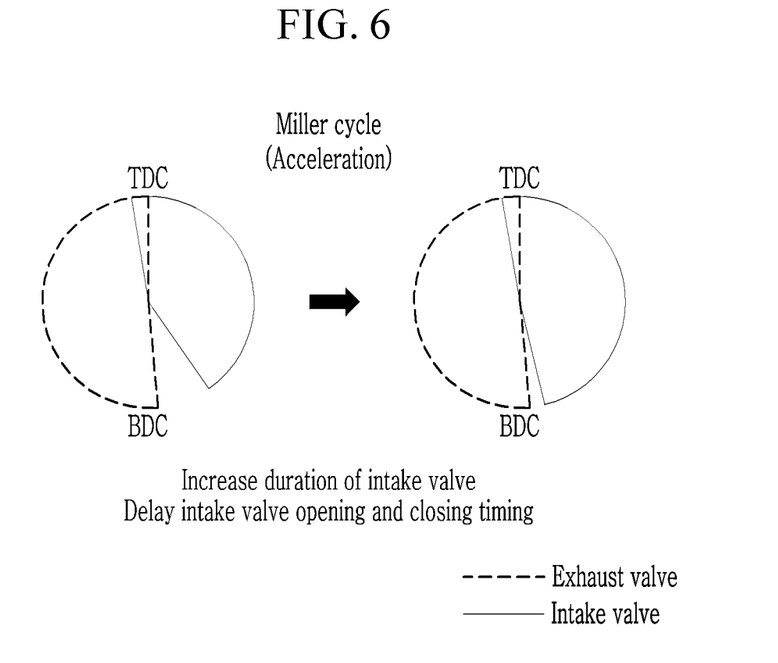
FIGS. 6 to 9 are diagrams respectively illustrating an opening and closing timing of the intake valve according to a type of engine and a traveling state of a vehicle in some embodiments of the present disclosure.

As such, when the IVC timing is delayed while the IVO timing is fixed, the sealed volume of the cylinder 11 increases, and the amount of air introduced into cylinder 11 increases. Accordingly, the torque output from the cylinder 11 of the engine 10 increases (see FIG. 6).

Conversely, in the Miller cycle engine 10, when it is determined that the vehicle is in the deceleration state based on the demanded torque of the driver, the controller 50 decreases the opening duration of the intake valve 13 through the CVVD device 41, and when the opening and closing timing of the intake valve 13 is advanced through the CVVT device 43, the IVO timing is maintained in the fixed state, and the IVC timing is advanced.

Figure 7:
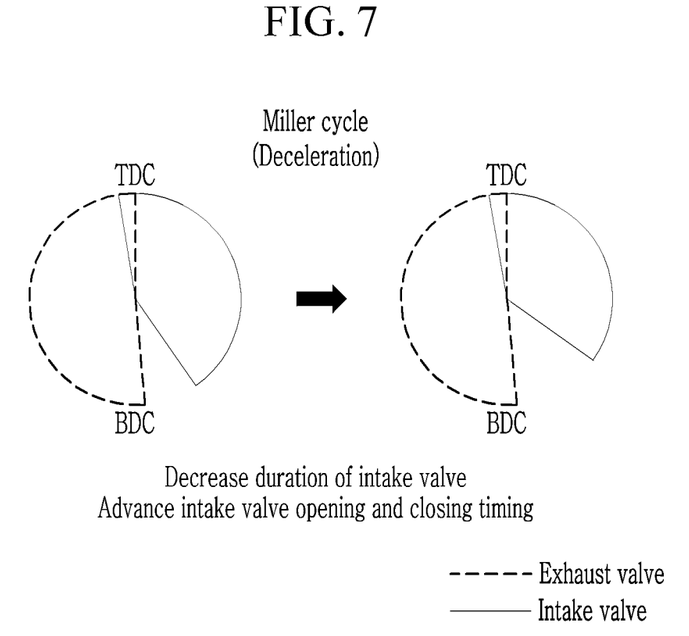

As such, when the IVC timing is advanced while the IVO timing is fixed, the sealed volume of the cylinder 11 decreases, and the amount of air introduced into cylinder 11 decreases. Accordingly, the torque output from the cylinder 11 of the engine 10 decreases (see FIG. 7).

In the Atkinson cycle engine 10, when it is determined that the vehicle is in the acceleration state based on the demanded torque of the driver, the controller 50 decreases the opening duration of the intake valve 13 through the CVVD device 41, and when the opening and closing timing of the intake valve 13 is advanced through the CVVT device 43, the IVO timing is maintained in the fixed state, and IVC closing timing is advanced.

Figure 8:
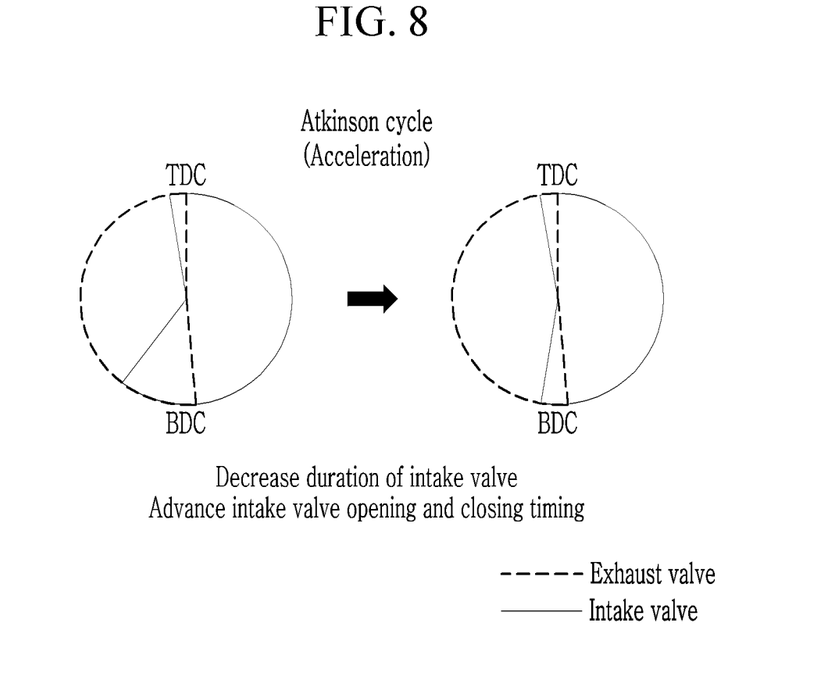

As such, when the IVC timing is advanced while the IVO timing is fixed, the sealed volume of the cylinder 11 increases, and the amount of air introduced into cylinder 11 increases. Accordingly, the torque output from the cylinder 11 of the engine 10 increases (see FIG. 8).

Conversely, in the Atkinson cycle engine 10, when it is determined that the vehicle is in the deceleration state based on the demanded torque of the driver, the controller 50 increases the opening duration of the intake valve 13 through the CVVD device 41, and when the opening and closing timing of the intake valve 13 is delayed through the CVVT device 43, the IVO timing of the intake valve is maintained in the fixed state, and the IVC timing is delayed.

Figure 9:
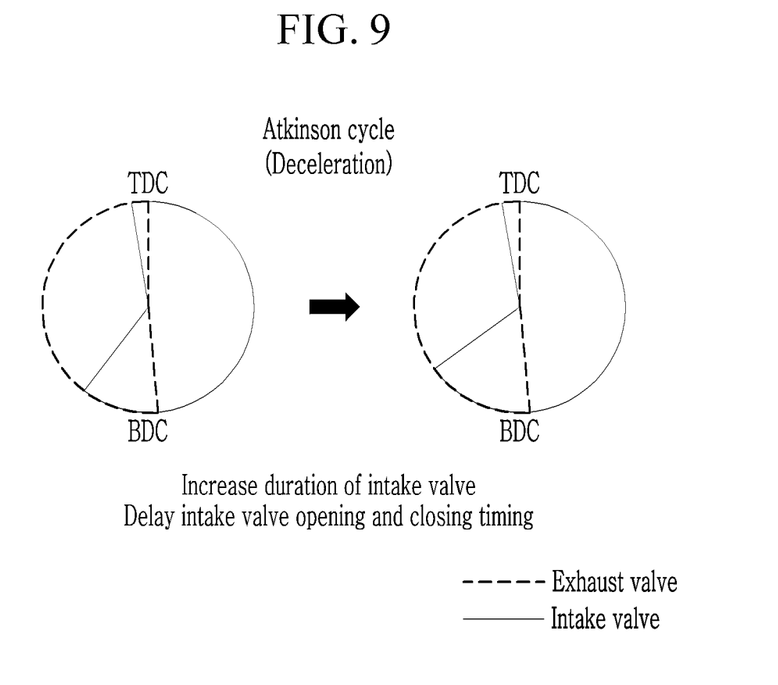

As such, when the IVC timing is delayed while the IVO timing is fixed, the sealed volume of the cylinder 11 decreases, and the amount of air introduced into cylinder 11 decreases. Accordingly, the torque output from the cylinder 11 of the engine 10 decreases (see FIG. 9).

When the output torque of the engine 10 follows the demanded torque of the driver and a set time elapses (S50), the controller 50 stops the control of the IVC timing by using the CVVD device 41 and the CVVT device 43, and follows the demanded torque of the driver through the control of the throttle valve 20 and the supercharger 30 (S60).

Figure 10:
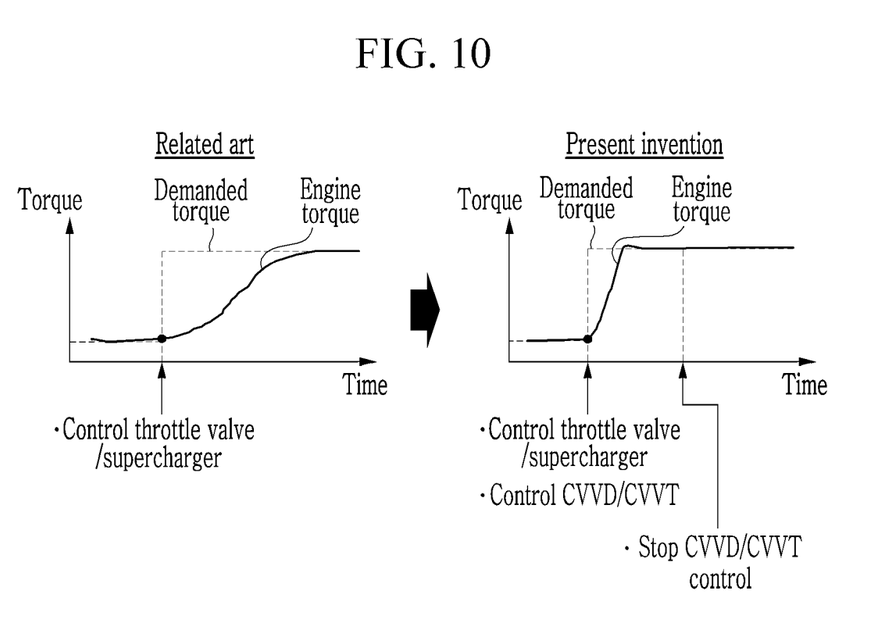
FIG. 10 is graphs illustrating an engine torque.

Referring to FIG. 10, when the controller 50 follows the demanded torque of the driver by controlling the operation of the throttle valve 20 and the supercharger 30, a time delay due to the intake path and a time delay due to the operation of the supercharger 30 occur, and it is impossible to quickly follow the demanded torque of the driver due to the time delay (refer to as "Related art" in FIG. 10).

On the other hand, as in the embodiment of the present disclosure, when the controller 50 controls the output torque of the engine 10 by adjusting the amount of air supplied into the cylinder 11 through the CVVT device 43 and the CVVD device 41, it is possible to quickly follow the demanded torque of the driver.

That is, in the transient section from when the demanded torque of the driver is input to when the demanded torque of the driver is followed by the throttle valve 20 and/or the supercharger 30, the controller 50 adjusts only the IVC timing by using the CVVD device 41 and the CVVD device 43, so that it is possible to quickly respond to a sudden change in the demanded torque of the driver (refer to as "Present invention" in FIG. 10).

Although the exemplary embodiment of the present disclosure has been described, the present disclosure is not limited thereto, and it is possible to carry out various modifications within the scope of the present disclosure, the detailed description of the present disclosure, and the accompanying drawings, and the modifications belong to the scope of the present disclosure as a matter of course.

DESCRIPTION OF SYMBOLS

10: Engine
11: Cylinder
13: Intake valve
15: Exhaust valve
20: Throttle valve
30: Supercharger
40: Variable valve device
41: Variable valve duration device
43: Variable valve timing device
50: Controller
70: Accelerator position sensor While the present disclosure has been described in connection with what is presently considered to be practical exemplary embodiments, it is to be understood that the present disclosure is not limited to the disclosed embodiments. On the contrary, it is intended to cover various modifications and equivalent arrangements included within the spirit and scope of the present disclosure.

What is claimed is:

1. An apparatus for controlling an engine, the apparatus comprising:
an engine including a cylinder generating power by combustion of fuel;
a throttle valve configured to adjust a flow rate of intake air supplied to the cylinder;
a supercharger configured to supply supercharged air to the cylinder;
an intake valve configured to supply intake air by selectively opening and closing the cylinder;
a variable valve timing device configured to adjust opening and closing timings of the intake valve;
a variable valve duration device configured to adjust an opening duration of the intake valve; and
a controller configured to adjust an amount of air inside of the cylinder by fixing an intake valve opening (IVO) timing and adjusting an intake valve closing (IVC) timing through the variable valve timing device and the variable valve duration device in a transition section from a time at which a demanded torque by a driver is input to a time at which the demanded torque is followed by the throttle valve or the supercharger,
wherein when an amount of change in the demanded torque of the driver is smaller than a set value and a vehicle is in an acceleration state, the controller is configured to increase the amount of air inside the cylinder through the variable valve timing device and the variable valve duration device, and
wherein:
when the engine is a Miller cycle engine, the controller is configured to:
increase an opening duration of the intake valve through the variable valve duration device, and delay the intake valve opening and closing timing through the variable valve timing device; and
when the engine is an Atkinson cycle engine, the controller is configured to: decrease the opening duration of the intake valve through the variable valve duration device, and advance the intake valve opening and closing timing through the variable valve timing device.

2. The apparatus of claim 1, wherein:
the demanded torque of the driver is calculated from an amount of change of an accelerator per unit time.

3. The apparatus of claim 1, wherein:
when a torque of the engine follows the demanded torque of the driver,
the controller is configured to:
stop adjusting the amount of air inside the cylinder through the variable valve duration device and the variable valve timing device, and
follow the demanded torque of the driver through the control of the throttle valve or the supercharger.

4. The apparatus of claim 1, wherein:
when the amount of change in the demanded torque of the driver is smaller than the set value and the vehicle is in a deceleration state,
the controller is configured to decrease the amount of air inside the cylinder through the variable valve timing device and the variable valve duration device.

5. The apparatus of claim 4, wherein:
when the engine is the Miller cycle engine, the controller is configured to:
decrease the opening duration of the intake valve through the variable valve duration device, and
advance the intake valve opening and closing timing through the variable valve timing device.

6. An apparatus for controlling an engine, the apparatus comprising:
an engine including a cylinder generating power by combustion of fuel;
a throttle valve configured to adjust a flow rate of intake air supplied to the cylinder;
a supercharger configured to supply supercharged air to the cylinder;
an intake valve configured to supply intake air by selectively opening and closing the cylinder;
a variable valve timing device configured to adjust opening and closing timings of the intake valve;
a variable valve duration device configured to adjust an opening duration of the intake valve; and
a controller configured to adjust an amount of air inside of the cylinder by fixing an intake valve opening (IVO) timing and adjusting an intake valve closing (IVC) timing through the variable valve timing device and the variable valve duration device in a transition section from a time at which a demanded torque by a driver is input to a time at which the demanded torque is followed by the throttle valve or the supercharger,
wherein when an amount of change in the demanded torque of the driver is smaller than a set value and a vehicle is in an acceleration state, the controller is configured to increase the amount of air inside the cylinder through the variable valve timing device and the variable valve duration device, and wherein:

when the engine is an Atkinson cycle engine, the controller is configured to:
- decrease an opening duration of the intake valve through the variable valve duration device, and
- advance the intake valve opening and closing timing through the variable valve timing device.

7. The apparatus of claim 6, wherein:

when the amount of change in the demanded torque of the driver is smaller than the set value and the vehicle is in a deceleration state, the controller is configured to decrease the amount of air inside the cylinder through the variable valve timing device and the variable valve duration device; and when the engine is the Atkinson cycle engine, the controller is configured to: increase the opening duration of the intake valve through the variable valve duration device, and delay the intake valve opening and closing timing through the variable valve timing device.

8. A method of controlling an engine, the method comprising:

determining, by a controller, whether an amount of change of a demanded torque by a driver is smaller than a set value;

determining, by the controller, whether a vehicle is in an acceleration state or a deceleration state; and adjusting, by the controller, an amount of air inside of a cylinder of the engine by fixing an intake valve opening (IVO) timing and adjusting an intake valve closing (IVC) timing through a variable valve timing device and a variable valve duration device in a transition section from a time at which the demanded torque of the driver is input to a time at which the demanded torque of the driver is followed by a throttle valve or a supercharger, wherein:

upon determining that the amount of change in the demanded torque of the driver is smaller than the set value and the vehicle is in the acceleration state, increasing the amount of air inside of the cylinder by controlling the variable valve timing device and the variable valve duration device;

upon determining that the engine is a Miller cycle engine, increasing an opening duration of the intake valve through the variable valve duration device, and delaying the intake valve opening and closing timing through the variable valve timing device; and upon determining that the engine is an Atkinson cycle engine, decreasing the opening duration of the intake valve through the variable valve duration device, and advancing the intake valve opening and closing timing through the variable valve timing device.

9. The method of claim 8, wherein:

upon determining that a torque of the engine follows the demanded torque of the driver, stopping adjusting the amount of air inside the cylinder through the variable valve duration device and the variable valve timing device, and controlling the throttle valve or the supercharger to follow the demanded torque of the driver.

10. The method of claim 8, wherein:

upon determining that the amount of change in the demanded torque of the driver is smaller than the set value and the vehicle is in a deceleration state, decreasing the amount of air inside the cylinder by controlling the variable valve timing device and the variable valve duration device.

11. The method of claim 10, wherein:

upon determining that the engine is the Miller cycle engine, decreasing the opening duration of the intake valve through the variable valve duration device, and advancing the intake valve opening and closing timing through the variable valve timing device.

12. The method of claim 10, wherein:

upon determining that the engine is the Atkinson cycle engine, increasing the opening duration of the intake valve through the variable valve duration device, and delaying the intake valve opening and closing timing through the variable valve timing device.

\* \* \* \* \*